United States Patent
Sisk

(12) 
(10) Patent No.: US 6,170,976 B1
(45) Date of Patent: *Jan. 9, 2001

(54) PREASSEMBLED FLUIDIZING DEVICE HAVING EXPANSIVE AIR PASSAGE STIMULATING ENHANCED FLOW OF GRANULAR MATERIALS IN TANK TRAILERS AND CONTAINERS

(75) Inventor: David E. Sisk, Bonne Terre, MO (US)

(73) Assignee: Sure Seal, Inc., Mineral Point, MO (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

This patent is subject to a terminal disclaimer.

(21) Appl. No.: 09/406,419

(22) Filed: Sep. 27, 1999

Related U.S. Application Data

(63) Continuation of application No. 09/008,102, filed on Jan. 16, 1998, now Pat. No. 5,988,867

(60) Provisional application No. 60/036,367, filed on Jan. 24, 1997.

(51) Int. Cl.$^7$ .............................. B01F 13/02; B65G 53/38; B65G 69/06
(52) U.S. Cl. ........................... 366/101; 222/195; 406/137
(58) Field of Search ..................................... 366/101, 106, 366/107, 154.1, 341; 406/134, 136, 137; 137/852, 854; 222/195; 239/533.13

(56) References Cited

U.S. PATENT DOCUMENTS

| | | | |
|---|---|---|---|
| 3,342,888 | * | 9/1967 | Anderson et al. . |
| 3,454,182 | * | 7/1969 | Morton . |
| 3,929,261 | * | 12/1975 | Solimar . |
| 3,952,956 | * | 4/1976 | Steele . |
| 4,030,755 | * | 6/1977 | Heimke . |
| 4,172,539 | * | 10/1979 | Botkin . |
| 4,189,262 | * | 2/1980 | Anderson . |
| 4,662,543 | * | 5/1987 | Solimar . |
| 4,820,052 | * | 4/1989 | Krysel . |
| 5,017,053 | * | 5/1991 | Sisk . |
| 5,139,175 | * | 8/1992 | Krysel et al. . |
| 6,007,234 | * | 12/1999 | Steele ................................... 366/101 |

* cited by examiner

Primary Examiner—Charles E. Cooley
(74) Attorney, Agent, or Firm—Paul M. Denk

(57) ABSTRACT

A preassembled fluidizing device that incorporates an expansive air passage that stimulates the enhanced flow of granular materials to the discharge port of a tank trailer, vessel, bin, or other container, during usage. The fluidizing device includes an aerator housing having affixed thereto a wear plate, the upper end of the housing having a mount to which a resilient gasket may be applied, and prestressed against the wear plate, once assembled. A fastening rod extends from the aerator housing and mounting boss, and a positioning or clip secured thereto provides an initial fastening of the preassembled device in place, once installed. A nut or other fastener connects with the opposite end of the fastening rod in order to tightly secure and seal an air distributor in place, for final assembly of the fluidizing device of this invention.

2 Claims, 6 Drawing Sheets

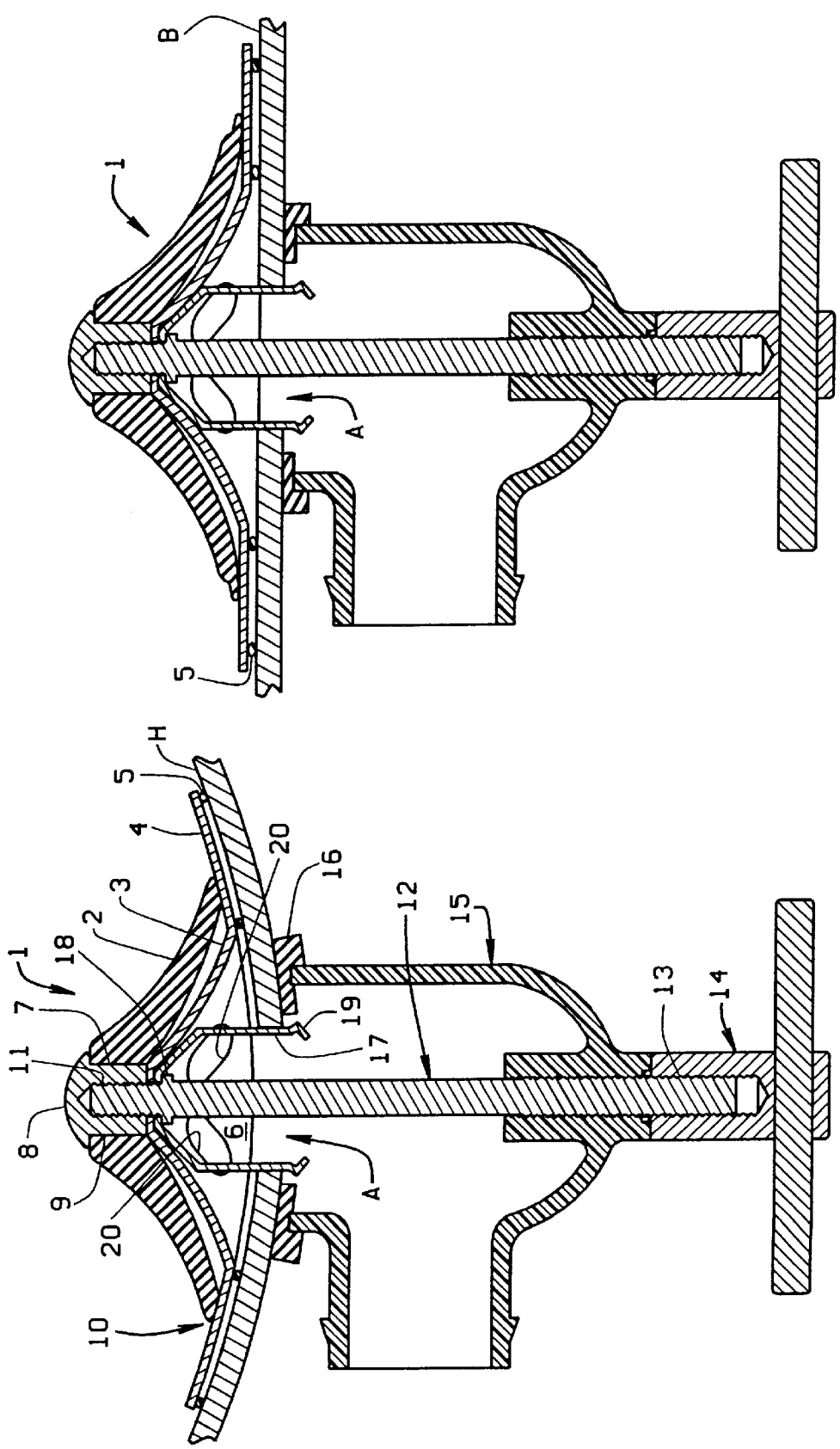

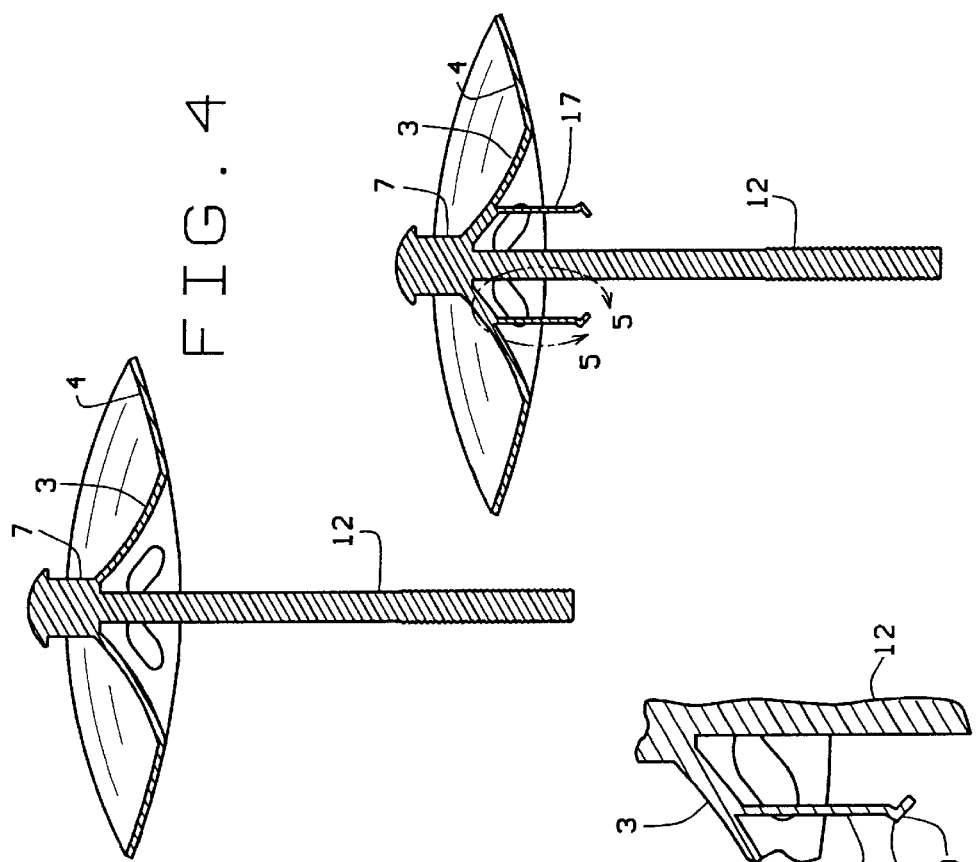
FIG. 4
FIG. 4A
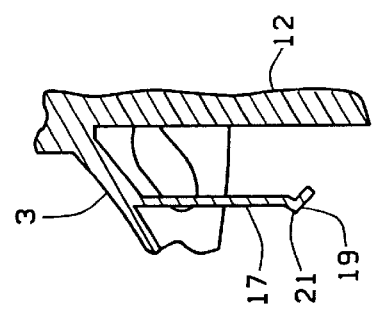
FIG. 5
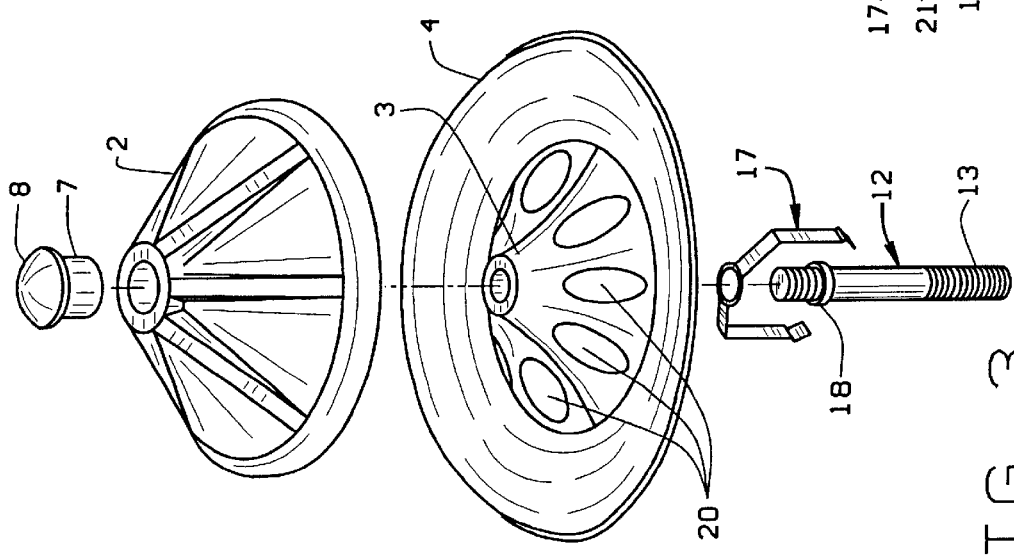
FIG. 3

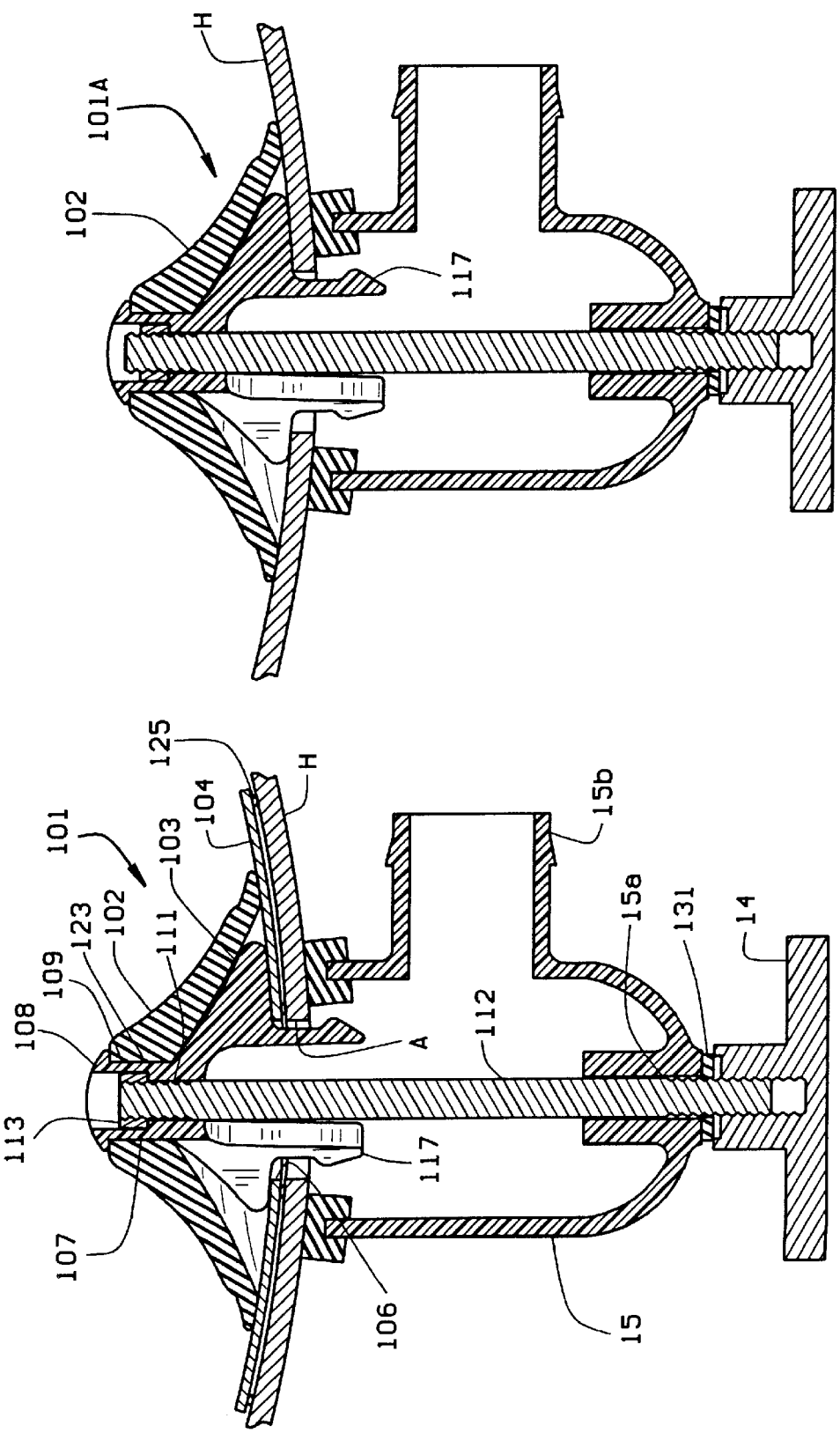

PREASSEMBLED FLUIDIZING DEVICE HAVING EXPANSIVE AIR PASSAGE STIMULATING ENHANCED FLOW OF GRANULAR MATERIALS IN TANK TRAILERS AND CONTAINERS

CROSS-REFERENCE TO RELATED APPLICATIONS

This application is a continuation patent application Ser. No. 09/008,102, filed Jan. 16, 1998, now U.S. Pat. No. 5,988,867 which is an application related to provisional application Ser. No. 60/036,367 filed Jan. 24, 1997, and which is incorporated herein by reference.

BACKGROUND OF THE INVENTION

This invention relates to aeration devices for bulk storage containers, such as hoppers, tank cars, etc. to facilitate the discharge of dry material from the containers.

Many prior art devices are available for providing aeration to bulk materials stored within a container to stimulate their flow within the container. Obviously, such containers can comprise a tank trailer, railroad car, a vessel bulk storage area, and related types of devices that are used to convey and store primarily granular and dry materials in bulk quantities. Such bulk materials, by way of information may include cement, lime, flour, plastic resins, and any of a large variety of generally dry powdered and bulk type of material that needs to be conveyed, in massive amounts, but when they reach their destination, require assistance to provide for their discharge, from their storage containers.

For example, the applicant herein has obtained U.S. Pat. No. 5,017,053, upon an aeration device for bulk material containers. As shown therein, the aeration device comprises a molded plastic hollow body that has air permeable attributes. As pressurized air flows into the shown device, the air permeates through the molded body, to assist in the fluidizing of the granular material to stimulate its flow within its storage container. Usually, such storage containers will have either an arcuate, curved, or sloping base wall. Through the injection of pressurized air into the aeration device, or by vibratory movement of the aeration device, the granular material can achieve a fluid flow until all of it discharges from the hopper or other storage container.

An early bin aerator can be seen in the U.S. Pat. No. 3,952,956, which shows a vibrating rubber housing that is used to help dislodge materials from the walls of a bin during discharge. Other United States patents disclose related types of fluidizing means for transfer of powdered substances. One such device is shown U.S. Pat. No. 4,030, 755. Another such device is shown in U.S. Pat. No. 3,343, 888 to Anderson, et al.. The Anderson patent shows a hopper arrangement for pneumatically unloading containers of granular material. Once again, the object of these devices is to fluidize the powdered material to achieve and stimulate its flow, along a sloping surface, to the discharge exit of the storage container. U.S. Pat. No. 4,172,539 to Botkin shows another early style of aerator nozzle for use creating a fluidized flow of granular or powdered material. U.S. Pat. No. 4,189,262 to Anderson shows a variety of such aeration devices and apparatuses, and their method for handling dry bulk materials in a hopper-style container using air agitation to achieve fluid flow.

U.S. Pat. No. 3,929,261 to Solimar shows a further aeration device and method for assisting discharge of material from containers. The Solimar aeration device has a body formed into a conical shape upon which a flexible flapper valve mounts. When air under pressure is injected through the body, it flaps the valve, emitting pressurized air into the granular material, and likewise inducing vibratory flow, to achieve discharge of granular material from the shown conically shaped bottom of the disclosed hopper. While the shown Solimar device is effective for its intended purposes, one of the problems associated with it is that its body extension substantially reduces the effective size of the apertures through which the pressurized air may flow, and thus creates a back pressure. This has a detrimental effect in achieving the enhanced intended results sought from such an apparatus (i.e., to obtain a substantial flow of all of the pressurized air through the flapper member, and into the granular material, without any significant back pressure, in order to enhance fluid flow).

U.S. Pat. No. 4,662,543, also to Solimar, shows a related style of aeration device for assisting in the aeration of material from containers. As can be seen from this Solimar patent, this second Solimar device substantially reduces the air flow space by inserting a substantial sized anchor stud therethrough. This anchor stud is the means for mounting the aeration device to the wall of the container, during its installation. Hence, it has been found that significant back pressures of the generated air, that is intended to flow through the aeration device, to achieve its functionality, has a detrimental effect upon obtaining maximum efficiency of air flow, to achieve enhanced fluidized flow of the granular material from the shown container. Furthermore, in order to provide for the effectiveness as alleged from this patented device, it substantially weakens and reduces the peripheral edges of its skirt cup, in order to obtain a pointed type of contact under pressure with the surface of the interior of the shown container, or its intermediate plate, as noted, to prevent the presence of any reverse angle into which granular material may flow, and cause blockage to the normal flow the pressurized air, during usage of the shown air aeration device.

There are also other aeration devices available upon the market, such as is shown in U.S. Pat. No. 4,820,052, where the housing means for such devices are formed more of a cylindrical shape, and have their flapper valves, also of corresponding cylindrical configuration, mounted thereon in order to achieve vibrations of the valve, and flow of pressurized air, to effect fluidizing of the granular material to stimulate its movement. These are examples of the style of prior art devices that are available in the trade. While they are reasonably effective to achieve their intended purposes, the current invention is designed to substantially enhance the functionality and operations of such an aeration device by significantly reducing the back pressure of air passing through such a device, while at the same time affording better vibratory effects to its flapper valve to stimulate fluidizing of the granular material. In addition, the current invention will be substantially constructed in preassembled form, so as to provide all of its installing components substantially assembled together, ahead of time, and only require the installation of a mounting bolt, to attain final installation and assembly, as distinct from the prior art devices that require their piece meal assembly and time and labor consumption to achieve workable installation.

BRIEF SUMMARY OF THE INVENTION

This invention contemplates the formation of a preassembled fluidizing device that significantly increases the expansive and unencumbered air passage provided through such a device to stimulate an enhanced flow of granular material within a tank trailer, container, or other type of holding vessel, to achieve better fluidized flow of such granular material during its discharge from such a storage means.

The fluidizing device of this invention is preferably substantially preassembled to ease mounting of the device to a holding vessel. The aeration device includes a preassembled aerator housing, that either mounts directly to or is integrally formed with a wear plate. It further includes an upper retention boss or mount that extends from the wear plate to facilitate the application and suspension of a resilient gasket thereon. Once installed, the gasket is prepressured into its installation, under proper pressure conditions, to allow for its immediate usage. The assembly of these components can be previously performed, at the manufacturing plant, and the entire unit can be shipped, preassembled, for immediate installation, rather than requiring a forwarding of just individual components, which must be assembled on site, through the expenditure of time consuming labor, as is required with prior art devices. Interiorly arranged of the aerator housing is a clip, or other similar means, for seating of the device within the predrilled aperture formed through the vessel wall. The clip is intended to provide some slight resiliency so that it may be easily mounted to the container through the predrilled aperture. The clip is intended to hold the aeration device in position until final installation of the aeration device is completed. Thus all that will be subsequently required in the installation is an air distributor, exteriorly of the vessel. The mount means that holds the gasket in place, has a central aperture provided therein, threaded or formed otherwise for holding of a fastening rod thereto. The fastening rod then extends out through the aperture in the vessel wall, and further extends outwardly from the associated air distributor. A nut, wing nut, or other fastener is applied to the end of the fastening rod to mount the device to the vessel. No force will be required for installation of the preassembled fluidizing device of this invention, since its gasket component will have been preassembled and mounted in position, with the required amount of pressure or force already inherent through its previous installation, and all that needs to be performed by the worker, when installing this device, is simply to locate the fastening rod through the air distributor, and secure it with any type of fastening means as previously described.

One of the primary attributes of this invention is that a much smaller diameter fastening rod is used in the installation of this device to the vessel wall, than as shown and required in prior art installations. For example, if the normal aperture drilled or otherwise cut through the vessel wall may be approximately an inch and a half in diameter, prior art devices used a cast style of stem which extends through the wall aperture and through which the air would flow. The cast stems add substantial bulk at this location, and significantly cuts down and blocks the open area through which the pressurized air can flow. It therefore, creates a back pressure which reduces the amount of air available for fluidizing the granular material. In the current invention, the fastening rod is, in the preferred embodiment, only a three-eighths inch threaded rod, or other type of rod means, to which an external nut may be applied. This smaller rod allows for a much greater air flow capacity to pass through the vessel wall, significantly reducing the amount of back pressure generated. In fact, through testing, it has been determined, even after the aerator has been installed, that the aerator of this current design increases the amount of air flow capacity by approximately 271% over the air flow passages available in the existing design type of aeration devices, such as previously described in the prior art Solimar patents. In addition, the aerator housing and wear plate assembly includes a significant amount of open air space through which the pressurized air may flow. The pressurized air thus has access to a substantial amount of the interior surface of the resilient and flexible gasket. This means that a greater abundance of the pressurized air is subjected directly to the interior of the gasket during operation of the aerator. This achieves a better vibratory effect for the functioning gasket and allows more of the pressurized air to flow under the gasket and into the granular material to achieve its fluidizing effect.

These are examples of the style of construction of the aeration device of this invention, and which provides for significantly enhanced functionality, during its usage.

Another enhanced advantage of the design of this current invention is the associated or integral resilient clip that is provided within the aerator housing. When a worker is installing one of the aerators from within the vessel, the clip, being of resilient design, can be forced through the vessel aperture. The entire preassembled device can thus be clipped into position. The worker, after installing five, ten or more of such devices, from the inside of the vessel, can then move outside and have the extending fastening rod stem readily available for installation of the air distributor. A simple fastening of a wing nut, nut, or other fastening means, will secure the preassembled fluidizing device in place. Thus, the clip will hold the aeration device in place, until it can be more permanently secured in place by the fastener. The aeration devices will not inadvertently fall back inside the vessel, as often occurs during installation of the prior art devices. Whereas, the installation of prior art devices, in many instances, requires two workers, the aeration device of the present invention can be installed by a single worker.

It is, therefore, the principal object of this current invention to provide a preassembled fluidizing device that can be immediately fastened within a hopper, tank car, or other vessel.

A further object of this invention is to provide a preassembled fluidizing device which affords greater capacity for flow of pressurized air therethrough, than has been provided in prior art related aeration devices.

Another object of this invention is to provide preassembled or kit style of aeration device for use for the foregoing purposes.

Another object of this invention is to provide a preassembled fluidizing device that may be installed by a single worker.

Yet another object of this invention is to provide a fluidizing device that significantly enhances the flow of pressured air therethrough to deliver a greater abundance of the pressurized air into the granular material, to achieve its fluidized flow.

Yet another object of this invention is to provide a fluidizing device which, because of its design, affords enhanced vibratory effects through passage of a greater abundance of air pressure through the resilient gasket of the fluidizing device, to help initiate and stimulate the fluidized flow of stored granular material, particularly when being discharged from its holding vessel.

Yet another object of this invention is to provide a fluidizing device which incorporates a particular style of wear plate, integrally fabricated of the aerator housing, and which wear plate can be fabricated to a variety of dimensions, and curvatures, so as to fit within tank trailers of arcuate design, or even shaped to provide for installation against a flat vessel surface, interiorly thereof, when installed.

These and other objects will become more apparent to those skilled in the art upon reviewing this summary of the invention, when considered in light of the description of this preferred embodiment, in view of the appended drawings.

BRIEF DESCRIPTION OF THE SEVERAL VIEWS OF THE DRAWINGS

FIG. 1 is a sectional view taken through the preassembled fluidizing device of this invention, showing the device installed in a hopper tank and having an air distributor secured externally of the wall of the hopper tank;

FIG. 2 shows the preassembled fluidizing device of this invention installed adjacent the flat wall of an industrial bin;

FIG. 3 is an exploded view of the fluidizing device of this invention;

FIG. 4 is a sectional view of the aerator wear plate and integral housing assembly, and further showing its extending fastening rod;

FIG. 4A is a sectional view of the aerator wear plate and housing, and further showing its installed resilient installation clip in place;

FIG. 5 is an enlarged view of a portion of the aerator housing and one leg of the installation clip taken along line 5—5 of FIG. 4A;

FIG. 12 is a cross-sectional view of a second embodiment of the fluidizing device disclosing a different clip and a different wear plate;

FIG. 13 is a cross-sectional view of the fluidizing device assembled without the wear plate;

DETAILED DESCRIPTION OF THE INVENTION

Figure 7:
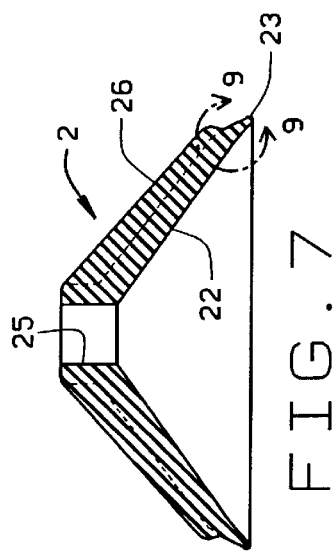
FIG. 7 is a cross-sectional view of the aerator gasket taken along line 7—7 of FIG. 6.
Figure 8:
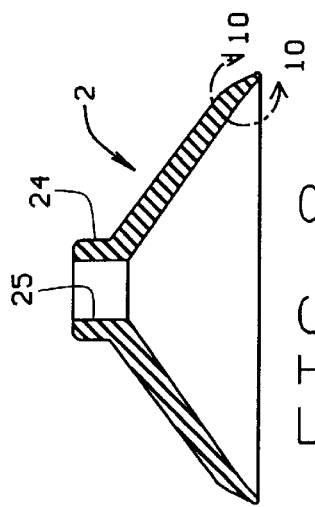
FIG. 8 is a sectional view of the aerator gasket taken along line 8—8 of FIG. 6.
Figure 11:
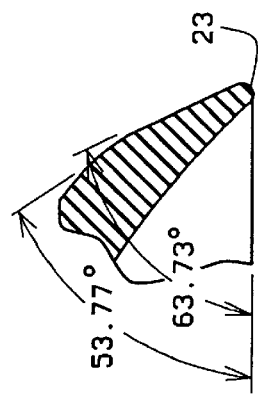
FIG. 11 is a further view of the tip edge of the gasket identical to FIG. 10, but showing further dimensions for the gasket at said location.
Figure 10:
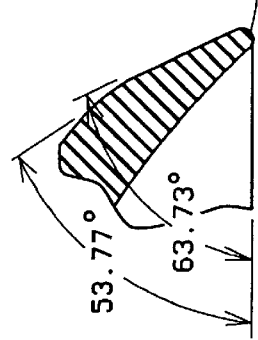
FIG. 10 is a further view of the tip end of the gasket taken along line 10—10 of FIG. 8 disclosing the various dimensional parameters associated therewith.
Figure 6:
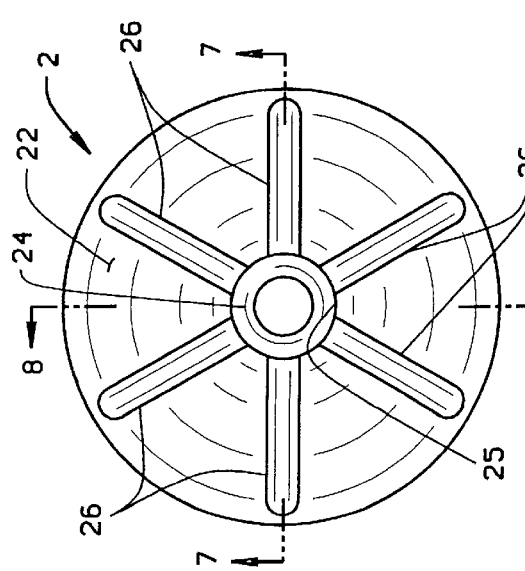
FIG. 6 is a top view of the aerator gasket of this invention.
Figure 9:
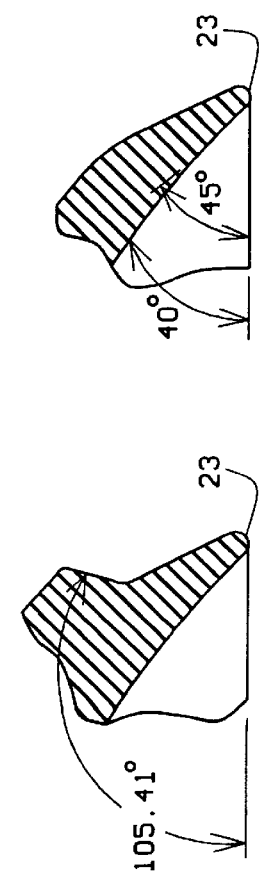
FIG. 9 is an enlarged view of the tip edge of the aerator gasket taken along line 9—9 of FIG. 7.
Figure 15:
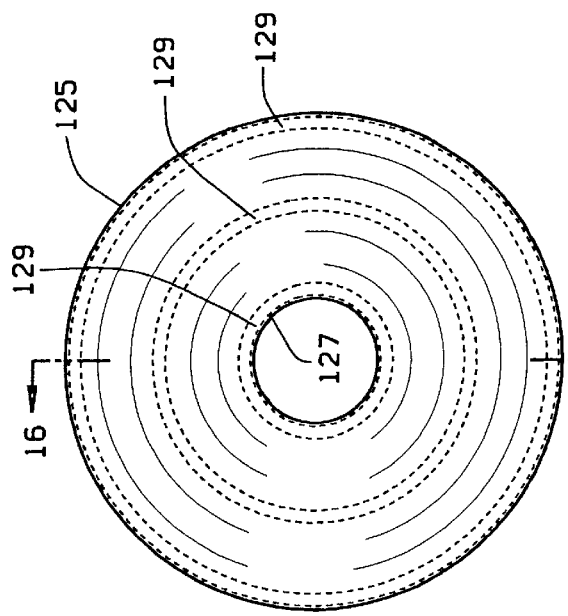
FIG. 15 is a top plan view of a gasket used in association with the wear plate of FIG. 12.
Figure 16:
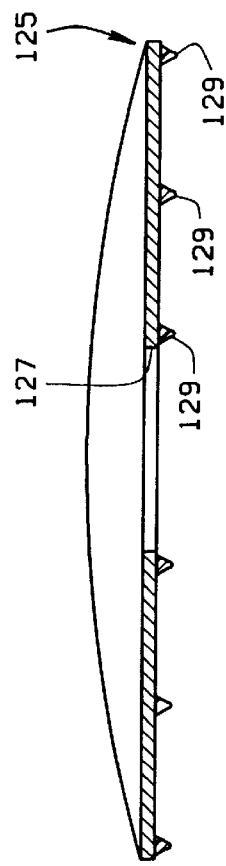
FIG. 16 is a cross-sectional view of the gasket taken along line 16—16 of FIG. 15.

In referring to the drawings, and in particular FIG. 1, the preassembled fluidizing device 1 of this invention is shown. As can be seen, the fluidizing device 1 is normally mounted to a hopper cone or wall H which is normally formed within a tank trailer or vessel as of an arcuate shape. Alternately, as can be seen in FIG. 2, the fluidizing device 1 of this invention can be installed, as within an industrial bin B, the walls of the which may be of a flat design. The hopper H or the bin B has a hole, aperture, or port A formed in its wall to allow for the passage of air into the fluidizing device 1.

The fluidizing device 1 includes a resilient or flexible gasket 2, formed of a rubber, or other flexible polymer, which is of a strength which allows for its firm mounting upon the aeration device. The gasket 2, however, is sufficiently resilient so as to provide for its somewhat flapper like operation when subjected to pressurized air from within. The fluidizing device 1 further includes an aerator housing 3 which is integrally formed therewith a wear plate 4. The wear plate 4 is designed to have a contour which corresponds to the contour of the inner surface of the hopper H, so that it may be mounted flush against the hopper H. As can also be seen, when installed, the device may include any type of a seal 5 intermediate the wear plate and the hopper wall. The seal 5 may be of any type of sealing means, such as formed of silicone, or other polymer, or other type of sealing material or gasket. One of the primary objects is to prevent the passage of granular material between the wear plate 4 and the hopper H and through the air port 6. The seal 5 also substantially prevents the escape of the pressurized air through the port 6. The upper end of the aerator housing includes a mount or boss 7. The boss 7 can be threadedly engaged in place or integrally formed with the housing 3, for example by a casting process. The upper edge of the boss 7 includes a headlike member 8, to provide a reduced shoulder area 9 about which the resilient gasket 2 is mounted. As can be noted, though, when the combined aerator wear plate 4, its housing 3, and the boss 7, with its head 8 are located together, and held in position, whether it be integrally formed, through casting, or assembled into position as to be subsequently described, they are ready for reception of the resilient gasket 2 thereon. The wear plate 4, housing 3, boss 7, and gasket 2 can be preassembled at the manufacturing plant, and inherently stressed for biasing against the outer surface of the wear plate 4, as at its juncture 10, as can be noted.

The boss 7 may be internally threaded, as at 11 to threadedly receive a fastening rod 12. Alternately, the fastening rod 12 can be force fit or cast therein. The fastening rod 12 extends axially downwardly from the preassembled fluidizing device and through the air port 6 in the hopper H or bin B. The lower end of the rod 12 is preferably threaded as at 13 to receive a nut, bayonet lock, wing nut, or other type of fastening element, such as the T-handle 14. The fastening rod 12 can be provided with other types of conventional means for accepting another type of conventional fastener. The purpose of the fastening means 13 and handle 14, as for securing upon the threaded end of the fastening rod 12, is to force and support into positioning the air distributor, or port housing 15, and through which the pressurized air flows, for delivery to the fluidizing device 1, once assembled, and installed to the hopper cone, tank, or the like, as can be seen. A further seal 16 is provided between the air distributor 15 and the exterior of the hopper wall H, so as to prevent any passage of the pressurized air therethrough, during operation of the fluidizing device.

To facilitate installation of the fluidizing device 1, a clip means 17 is secured interiorly of the aerator housing 3. The fastening rod 12 includes a shoulder flange 18 upon which the clip means 17 sits. Alternately, the clip means 17 can be integrally cast with the wear plate and the aerator housing, when initially formed, as seen in FIG. 4A. Preferably, the clip means 17 may be just that, a resilient clip that has some spring tensioning inherent therein to allow its lower beveled end 19 to deflect and pass through the aperture A formed through the hopper wall. The clip means 17 serves to secure the preassembled fluidizing device in place, through the hopper wall, when initially installed from the interior of the hopper. It will hold the fluidizing device 1 in place until such time as the worker can position an air distributor 15 in place and secure the device in place by threading the T-handle 14, or other fastener, upon the fastening rod 12.

FIG. 3, as previously explained, discloses, in an exploded view, the various components forming the preassembled fluidizing device of this invention, including the fabricated mount or boss 7 with its head 8, the resilient gasket 2, in addition to the integrally formed wear plate and housing 3 and 4, as noted. Furthermore, the clip means 17 is disclosed, which is preferably formed of rather thin dimensions, so as to provide some inherent resiliency, to afford its functioning as a clip for preholding of the device in place, when initially installed from the interior of the vessel. And, the fastening rod 12 is also shown. What is to be noted is that the resilient clip 17 has relatively narrow width, requiring only that structural strength to allow the clip to hold the device initially in place, during its preliminary installation, as previously explained.

What is further to be noted from FIG. 3 is that the aerator housing 3, as shown, has an arcuate configuration, although it may be cone shaped in its structural configuration. The housing 3 also has a series of air ports 20 therethrough, around its circumference, which provides for a greater capacity for flow of pressurized air through the housing to the interior of the resilient gasket 2. This will facilitate better air flow through the aerator and the impingement of pressurized air against the gasket 2, to cause the gasket 2 to vibrate, entirely around its perimeter. The increased air flow will allow the pressurized air to escape under the gasket 2, when fluidizing the granular material from within the hopper tank, during its discharge.

In addition, and as previously explained, and as can be further noted from FIGS. 1 and 2, the fastening rod 12 of this invention is the only minor obstruction to the passage of air through the aperture A provided within the hopper wall, as distinct from prior art style of aeration devices as previously explained. As a result, there is much lesser resistance to the flow of the pressurized air through the aperture of the hopper wall. The air can more easily flow into the aerator housing of this invention, for attaining its complete access to the interior of the resilient gasket, during functioning of this device.

As can be seen further in FIG. 4A, the aerator housing 3, and its wear plate 4, in addition to its formed boss 7, the fastening rod 12, and the clip 17 may be integrally formed, as from a casting process, during their initial fabrication. In FIG. 4, the aerator housing 3, the wear plate 4, and the boss 7 are integrally formed. This is distinct from the component assembly of these elements, as previously reviewed and explained with respect to the aerator assembly shown in FIG. 1. In addition, the slanted lower portion 19 of the clip includes a slight external protrusion 21. This extension provides for the clip fastening of the preassembled device within the hopper wall aperture A, in the manner as previously explained. In addition, FIG. 4A shows how the clip, when integrally formed with the aerator housing, extends downwardly, interiorly thereof, to provide for its disposition through and snap fastening within the hopper wall aperture A, as explained.

FIGS. 6 through 11 show the detailed construction of the molded and resilient aerator gasket 2. As can be seen, and as well known in the trade, an aerator gasket when used in conjunction with an aeration device, as reviewed herein, and as previously explained in the prior art, is intended to have sufficient resiliency and flexibility so as to allow the passage of the pressurized air under the edge of the gasket, to assist in fluidizing of the granular material, but likewise, to attain some flapper action to induce a vibratory effect to further stimulate the granular material into its downward flow towards the discharge port of the tank trailer, or the like. The gasket 2 of this invention includes, as can be seen from FIG. 7, a cone shaped wall 22 which extends downwardly towards its radiused tip 23 at its outer lower perimeter, but likewise slopes upwardly into the formation of an inherent but yet resilient sleeve-like integral portion 24, which is molded having an aperture 25 therethrough, so as to allow for the forced installation of the gasket over the head 8, and onto the mount or boss 7, of the aerator housing. Reinforcing ribs 26 can be molded into the gasket 2 to add strength necessary to provide for the inherent resiliency for the formed gasket, and to allow for its proper functionality. Furthermore, the outer tips 23 of the formed gasket, as can be seen from FIGS. 9 through 11, will have some degree of radius formed therearound, in order to afford structural strength to the gasket at this location, and to prevent its cracking and tearing after prolonged use, when subjected to pressurized air from interiorly thereof, and the weight of the granular material upon its outer surface, when the preassembled fluidizing device is installed within a tank trailer, or the like. Providing a sharp edge at this location, to obtain the results as explained in the previous U.S. Pat. No. 4,662,543, may lead toward premature failure of such a gasket, and the aeration device in general, due to repeated flapper action exerted upon the outer edge of such a skirt, as previously reviewed. Hence, it is desirable to form the outer tip of the gasket 2 with some degree of bulk such that, even at a conic edge, the gasket has some amount of radii in its formation. This is so, even though reverse or negative angles may be encountered when the gasket is placed upon and biases against the aerator wear plate of this current invention. The gasket 2 is designed to have significant inherent strength, even through the usage of their reinforcing ribs 26 as explained, and through the maintenance of sufficient bulk and thickness in the gasket's formation, when molded, in order to provide for an enhanced and longer useful life when employed.

A second embodiment of the fluidizing device is shown in FIG. 12. The fluidizing device 101 of FIG. 12 is substantially similar to the fluidizing device 1 of FIG. 1. It includes a gasket 102 identical to the gasket 2, a housing 103, a wear plate 104 having a central hole 106, and a clip 117. However, in the fluidizing device 101, the wear plate 104 is separate from the housing 103, and the housing 103 and the clip 117 are integrally formed. Additionally, the resilient clip 117 is formed differently than the clip 17.

Figure 14:
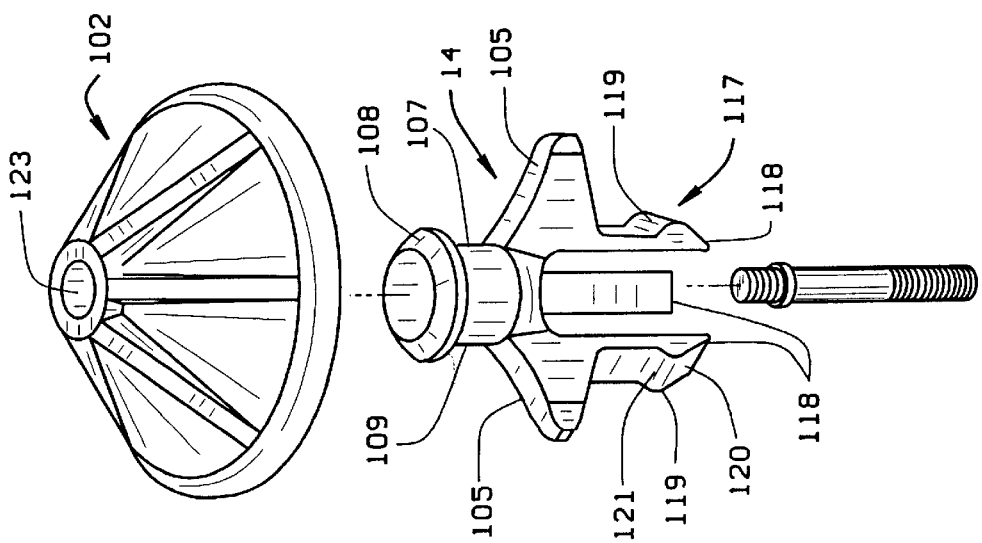
FIG. 14 is an exploded perspective view of the fluidizing device.

The aerator housing 3, as best seen in FIG. 14, includes three downwardly sloped arms or wings 105. The arms 105 are spaced apart by approximately 120° and have a slope substantially similar to the slope of the inner wall of the gasket 102. The arms 105 are joined at a central position by a boss 107 having a head 108. That is, the arms 105 radiate outwardly from the boss 107. The head 108 has a diameter larger than the boss 107, and thus the boss 107 and head 108 jointly define a shoulder 109. The boss 107 has a centrally aperture 111 which is sized to accept the fastening rod 112. The fastening rod 112 may be secured in the boss aperture 111 in any conventional means. It may be molded in place. The boss aperture 111 may be threaded, and the rod 112 can be threaded into place. If the rod 112 is threaded at its top, the head 108 can be countersunk and receive a nut 113, as shown in FIG. 12, to hold the rod 112 in place.

The clip 117 comprises three legs 118 which extend downwardly from bottom surfaces of the housing arms 105.

The clip lets 118 each have a shoulder flange 119 which extends radially outwardly from the legs 118. The legs 118 each include a sloped lower surface 120 which extends upwardly from the bottom of the legs to the flange 119, and a sloped upper surface 121 which extends from the leg, above the flange 119, downwardly to the flange 119. Thus, the bottom of the legs 118 are generally triangular in cross-section. The legs 118, above the flange 119, are sufficiently thin to render the legs flexible.

The gasket 102 has a central aperture 123 which is forced over the head 108 of the housing boss 107. The aperture 123 is stretchable to fit over the head 108, and is sized to fit around boss 107.

As with the fluidizing device 1, the fluidizing device 101 is preferably preassembled. The fastening rod 112 is connected to, or formed with, the housing 103 and the gasket 102 is applied to the housing 103. The combined gasket 102, housing 103, and rod 112, can then be applied to the wear plate 104. The wear plate 104, as noted, has a central aperture 106 which is equal in size to the hole A in the hopper wall H. Additionally, the wear plate 104 is shaped to conform to the contours of the hopper wall H. The clip legs 118 are simply inserted through the wear plate aperture 106. As this occurs, the legs 118 will flex inwardly as the shoulder portion 119 slides past the edge of the wear plate aperture 106. Once the shoulder portion 119 slides past the wear plate aperture 106, the wear plate will be loosely connected to the housing 103, by means of the clip 117. The fluidizing device 101 can then be applied to the inner surface of the hopper wall H in the same manner as the fluidizing device 1.

Preferably, a seal gasket 125 is placed between the wear plate 104 and the hopper wall H. The seal gasket 125 has a central aperture 127 substantially equal in diameter to the wear plate aperture 106. Additionally, the seal gasket 125 has circumferential ribs 129. When the seal gasket is positioned between the wear plate and the hopper wall H, the ribs 129 are preferably in contact with the hopper wall H.

The fluidizing device 101A, shown in FIG. 13, is identical to the fluidizing device 101 of FIG. 12. However, the fluidizing device 101A is assembled without the wear plate 104 and without the seal gasket 125.

As with the fluidizing device 1 of FIG. 1, the fluidizing devices 101 and 101A are applied to the hopper wall H simply by passing the clip legs 17 or 117 through the hopper wall hole A. The clip 117 will hold the fluidizing device in place until the air distributor 15 is positioned in place, and the fastener 14 is threaded, or otherwise fixed to the end of the rod 112. The fastener 14 will then hold the air distributor 15 in place externally of the hopper wall H and will hold the fluidizing device 101 in place internally of the hopper wall.

The air distributor 15 includes a passage 15a through which the rod 112 passes. A seal 131 is positioned around the rod 112 between the fastener 14 and the distributor 15 to reduce air leakage at this point.

Figure 17:
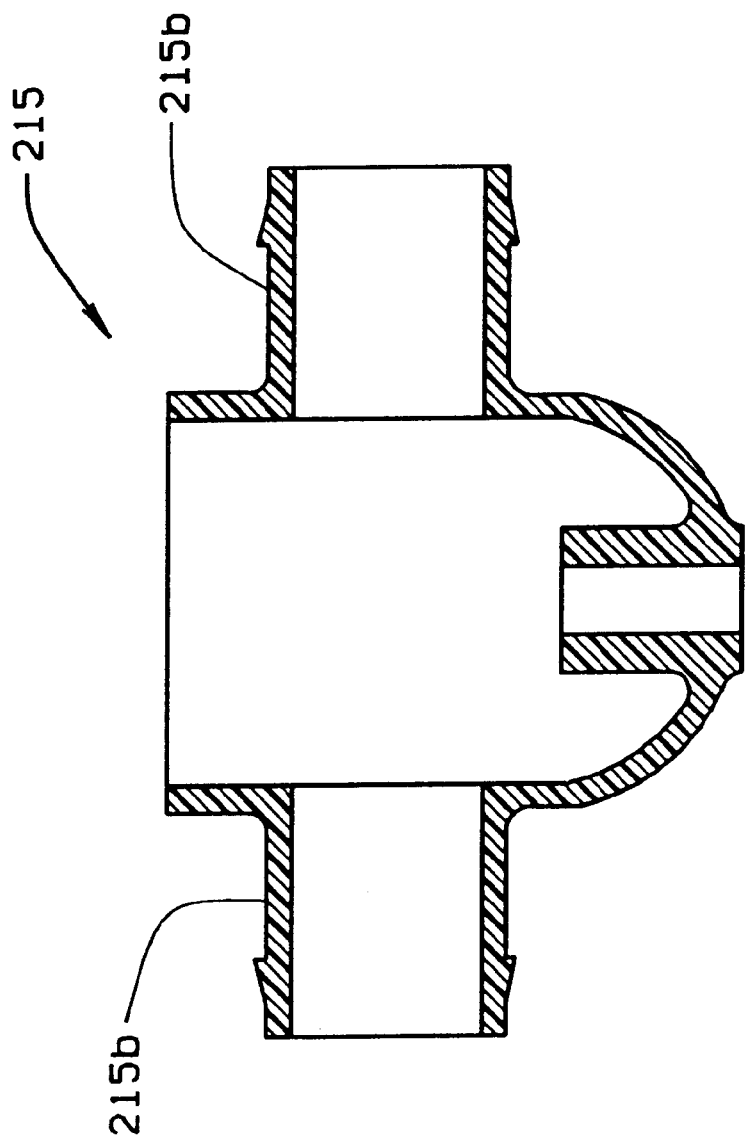
FIG. 17 is a cross-sectional view of an air distributor having two ports to enable the interconnection of multiple fluidizing devices to a single source of pressurized air.

The air distributor shown in FIGS. 1, 2, 12, and 13 includes only one connecting arm 15b. Thus, each air distributor must be provided with its own source of pressurized air, or the distributors must be connected to a manifold. However, the distributor 215 shown in FIG. 17 includes two connecting arms 215b. The use of two arms allows for the individual distributors to be connected in series, rather than in parallel. This will reduce the amount of tubing required to connect all the distributors which may be required for an individual hopper.

As noted above, the only obstruction to the flow of air from the air distributor into the aeration device itself is the narrow fastening rod. The inside of the aerator gasket is substantially open and accesspable to the air which enters the aerator. This design allows for more air to flow into the aerator than does prior art designs. This increased air flow translates into decreased unloading times. In Table I below, operation of the aerator was compared against operation of two prior art aerators—a Solimar aerator and a Heil Flo Cone aerator. Depending on the conditions and the substance being moved, the aerator of the present invention had a 20% to 50% improvement over the prior art aerators.

TABLE I

| Test | 1 | | 2 | | 3 | |
| --- | --- | --- | --- | --- | --- | --- |
| Device | Invention* | Solimar | Invention | Heil Flow Cone | Invention | Heil Flo Cone |
| Product | Soft Wheat Flour | Soft Wheat Flour | Type 1 Portland Cement | Type 1 Portland Cement | Soft Wheat Flour | Soft Wheat Flour |
| Pressure (psi) | 14 | 14 | 14 to 15 | 14 to 15 | | |
| Distance | 20' horiz 65' vert | 20' horiz 65' vert | | | 20' | 20' |
| lbs of product | 51,220 | 51,140 | 54,320 | 54,360 | 45,740 | 45,340 |
| Time to Unload (min) | 36 | 43 | 20 | 30 | 21 | 25 |
| lbs/min | 1,422.78 | 1,189.30 | 2,716.00 | 1,812.00 | 2,178.10 | 1,813.60 |
| % improvement | 19.63 | | 49.89 | | 20.1 | |

*Aerator of the present invention

As can be appreciated, the aerator is not only simple to install, but it can dramatically decrease unloading time. This decreased unloading time can translate into significant savings to the industry.

Variations or modifications to the subject matter of this invention may occur to those skilled in the art upon reviewing the disclosure as provided herein. For example, the gasket element 2 may be fabricated of rubber, a resilient polymer, or of any other material that may allow for its functionality when employed with a fluidizing device of this current design. Reinforcing ribs may or may not be required upon the gasket itself, depending upon the nature of usage of this preassembled device, and the type of material that may be conveyed within a tank trailer, hopper car, or the like, when employed. In addition, the preassembly of the various elements of the fluidizing device of this invention may be either assembled from a variety of components, that form the aerator housing, wear plate, fastening rod, clip means, and the like, as previously reviewed with respect to FIG. 1, or they all may be integrally molded, cast and fabricated as a one-piece element, as previously shown and explained in FIGS. 4, 4A, and 5, of this disclosure. In addition, the clip 17 may be fabricated to various designs, for example, it may be a form of fastening or locating positioner, at its lower edge, and rather than utilizing slanted ends, with protruding tabs, as previously explained, there may be a friction type of ring that may extend around the bottom of the legs 17 of the shown clip, in order to provide for initial tightening or locating of the preassembled device in place, from interiorly of the vessel, but yet hold the device securely until the worker locates outside the storage means, and can position the air distributor 15 in place, and apply a fastening means 14 onto the outer end of the rod 12. The head can be incorporated into the gasket, such that the fastening rod extends from the apex of the gasket. These are examples of the types of variations that may be made with respect to the subject matter of this development, and yet fall within the spirit and scope of this invention.

The description of the preferred embodiment set forth herein, and the drawings depicting the various elements of this invention, are set forth for illustrative purposes only.

I claim:

1. In combination, a hopper and an aeration device, the aeration device having an inner part and an outer part, the hopper having a wall with aperture therein, the inner part of the aeration device including a resilient spring mounting clip, said resilient spring mounting clip having a spring tension to allow an end of the clip to deflect and pass through said aperture and providing for the fixed securement of only the inner part of the aeration device through the aperture of the hopper wall and temporarily holding said inner part to the hopper wall proximate its aperture and interiorly of the hopper, the outer part of the aeration device attaching to the inner part of said aeration device, said outer part of the aeration device having an air distributor provided therein, the inner part of the aeration device including an aeration gasket, whereby upon delivery of pressurized air through the air distributor and to the aeration gasket providing for a fluidized flow of granular material contained within the said hopper.

2. The combination of claim 1 and including a fastening rod connecting to the inner part of the aeration device, said fastening rod extending through said hopper wall aperture externally of said hopper, and the outer part of the aeration device securing to said fastening rod externally of said hopper wall.

* * * * *